United States Patent
Shin et al.

(10) Patent No.: US 7,975,141 B2
(45) Date of Patent: Jul. 5, 2011

(54) METHOD OF SHARING BUS KEY AND APPARATUS THEREFOR

(75) Inventors: Jun-bum Shin, Suwon-si (KR); Yang-lim Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 823 days.

(21) Appl. No.: 11/875,187

(22) Filed: Oct. 19, 2007

(65) Prior Publication Data
US 2008/0267396 A1    Oct. 30, 2008

(30) Foreign Application Priority Data
Apr. 24, 2007   (KR) ................. 10-2007-0040055

(51) Int. Cl.
*H04L 9/32* (2006.01)
*H04L 9/00* (2006.01)
*H04L 9/08* (2006.01)

(52) U.S. Cl. ................. 713/171; 380/44; 380/278
(58) Field of Classification Search ................. 713/171; 380/44, 278
See application file for complete search history.

(56) References Cited

U.S. PATENT DOCUMENTS

| | | | |
|---|---|---|---|
| 2002/0141577 A1* | 10/2002 | Ripley et al. | 380/201 |
| 2002/0141578 A1* | 10/2002 | Ripley et al. | 380/201 |
| 2003/0009668 A1* | 1/2003 | Chan et al. | 713/171 |
| 2005/0081047 A1* | 4/2005 | Kitani | 713/193 |
| 2005/0089165 A1* | 4/2005 | Kitani et al. | 380/201 |
| 2005/0160284 A1* | 7/2005 | Kitani et al. | 713/193 |
| 2005/0198529 A1* | 9/2005 | Kitani | 713/200 |
| 2007/0209077 A1* | 9/2007 | Kitani | 726/26 |
| 2008/0069354 A1* | 3/2008 | Kitani et al. | 380/202 |
| 2008/0289038 A1* | 11/2008 | Kim et al. | 726/22 |
| 2010/0161972 A1* | 6/2010 | Staring et al. | 713/158 |

FOREIGN PATENT DOCUMENTS
WO      2004/053699 A2     6/2004

* cited by examiner

*Primary Examiner* — Christian LaForgia
(74) *Attorney, Agent, or Firm* — Sughrue Mion, PLLC

(57) ABSTRACT

A method and apparatus of sharing a bus key is provided, the method including receiving at a first device a device key, encrypted using an encryption key, from a storage device; decrypting the encrypted device key using a decryption key corresponding to the encryption key; creating a random number, and generating a bus key using the created random number and the decrypted device key, by which data to be transmitted through a bus can be encrypted using the bus key; and transmitting the generated bus key to a predetermined device connected to the first device via the bus.

18 Claims, 3 Drawing Sheets

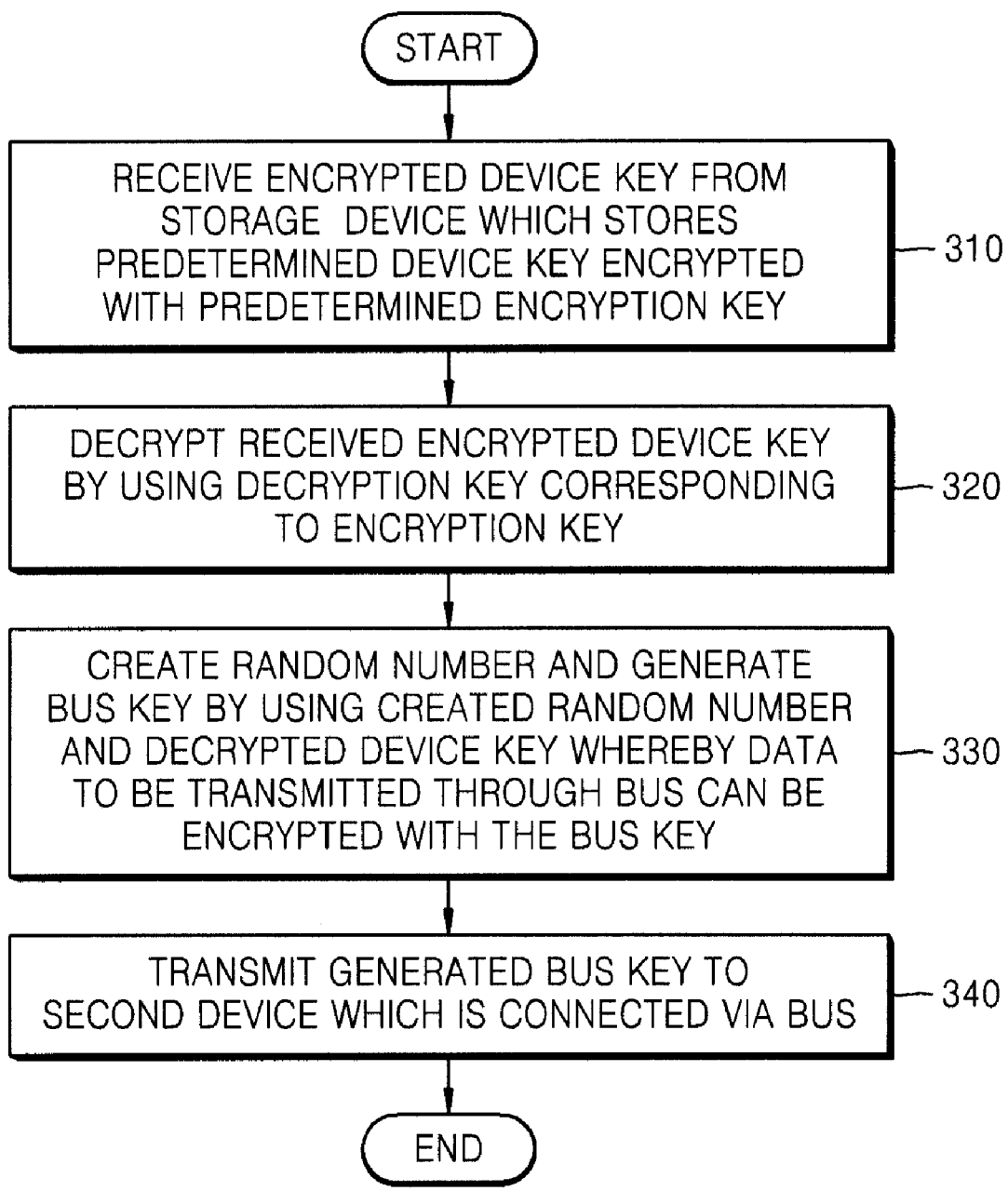

METHOD OF SHARING BUS KEY AND APPARATUS THEREFOR

CROSS-REFERENCE TO RELATED PATENT APPLICATION

This application claims priority from Korean Patent Application No. 10-2007-0040055, filed on Apr. 24, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to sharing a bus key.

2. Description of the Related Art

Recently, music and moving pictures contents are copied indiscreetly, and copied contents can be obtained easily. In order to prevent these problems from occurring, a digital rights management (DRM) method, that is, a method of protecting contents is recently highlighted and usage of the DRM method increases.

The DRM method of protecting contents is broadly classified into encryption and usage rights. That is, the DRM method prevents an unauthorized person from accessing contents by encrypting the contents, and also enables contents to be utilized only within an authorized scope, by checking the usage rights.

Despite the aforementioned methods, a third party can decipher a content encryption or eliminate a content period restriction which limits a content to be used only for a predetermined period, and then distribute the content so that anyone can utilize the content.

Accordingly, to prevent these problems from occurring, the DRM method provides a Robustness Rule that is the terms required for contents management devices to satisfy.

The DRM methods which are frequently used are Digital Transmission Content Protection (DTCP), Window Media Digital Right Management (WNDRM), and Advanced Access Content System (AACS). The Robustness Rule of these DRM methods generally requires safe protection of an encryption key, protection of deciphered contents against being disclosed to the exterior of devices, and protection of deciphered contents against being disclosed to user accessible buses within devices, for example, a peripheral component interconnect (PCI) bus, an integrated drive electronics (IDE) bus, or a universal serial bus (USB).

In particular, in order to manufacture a device which satisfies the term requiring the protection of the deciphered contents against being disclosed to user accessible buses, a related art method is encrypting data with a predetermined bus key before the data is transmitted through a bus.

Here, the bus key is generated by using a unique device key which is allocated to each device. However, in the related art method, the device key can be leaked to a third party thereby enabling the third party to generate a bus key. Also, when a bus key is leaked, a third party can decrypt data encrypted with the bus key, by using the bus key.

SUMMARY OF THE INVENTION

The present invention provides a method of sharing a bus key and an apparatus therefor to protect a device key, which is used to generate a bus key, and to protect encrypted data to be transmitted through a bus, even when a bus key has been leaked.

According to an aspect of the present invention, there is provided a method of sharing a bus key between a first device and a second device connected via a bus, the method including: receiving an encrypted device key from a storage device storing the predetermined device key encrypted with a predetermined encryption key; decrypting the received encrypted device key with a decryption key corresponding to the encryption key; creating a random number and generating a bus key by using the created random number and the decrypted device key whereby data that is to be transmitted through a bus can be encrypted with the bus key; and transmitting the generated bus key to the second device connected via the bus.

The random number may be newly created when a predetermined time passes or when the first device is initialized.

The device key may be a unique value allocated and stored in the storage device.

The second device may be an encoder which performs encoding of data to be transmitted through the bus or a decoder which performs decoding of encoded data to be transmitted through the bus.

The operation of generating the bus key may generate the bus key by using a key derivation function which generates the bus key by receiving the created random number and the decrypted device key as an input.

The bus may be one of a peripheral component interconnect (PCI) bus and an integrated drive electronics (IDE) bus.

The storage device may include an electrically erasable and programmable read only memory (EEPROM).

According to another aspect of the present invention, there is provided a bus key sharing apparatus including: a reception unit receiving an encrypted device key from a storage device storing the device key encrypted with a predetermined encryption key; a decryption unit decrypting the encrypted device key received from the reception unit with a decryption key corresponding to the encryption key; a bus key generation unit creating a random number and generating a bus key by using the created random number and the decrypted device key whereby data that is to be transmitted through a bus can be encrypted with the bus key; and a transmission unit transmitting the bus key generated from the bus key generation unit to a predetermined device connected via the bus.

According to another aspect of the present invention, there is provided a computer readable recording medium having recorded thereon a program for executing a method of sharing a bus key between a first device and a second device connected via a bus, the method including: receiving an encrypted device key from a storage device storing the predetermined device key encrypted with a predetermined encryption key; decrypting the encrypted device key received from the reception unit, with a decryption key corresponding to the encryption key; creating a random number and generating a bus key by using the created random number and the decrypted device key whereby data that is to be transmitted through a bus can be encrypted with the bus key; and transmitting the generated bus key to the second device connected via the bus.

BRIEF DESCRIPTION OF THE DRAWINGS

The above and other aspects of the present invention will become more apparent by describing in detail exemplary embodiments thereof with reference to the attached drawings, in which:

FIG. 3 is a flowchart illustrating a method of sharing a bus key between a first device and a second device connected via a bus, according to an exemplary embodiment of the present invention.

DETAILED DESCRIPTION OF EXEMPLARY EMBODIMENTS

The present invention will now be described more fully with reference to the accompanying drawings, in which exemplary embodiments of the invention are shown.

Figure 1:
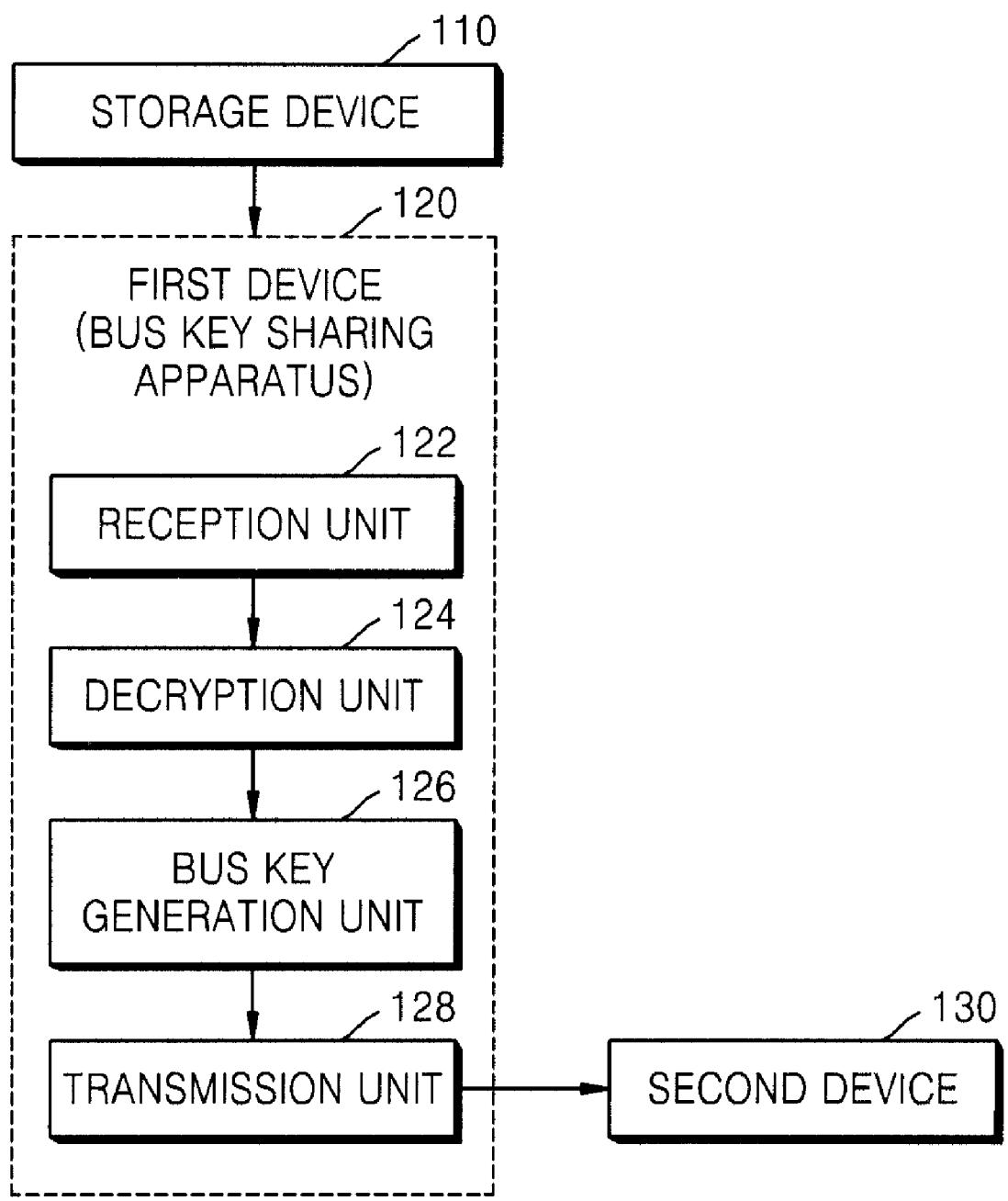
FIG. 1 is a block diagram illustrating a bus key sharing apparatus according to an exemplary embodiment of the present invention.

FIG. 1 is a block diagram illustrating a bus key sharing apparatus according to an exemplary embodiment of the present invention.

Referring to FIG. 1, a first device is a bus key sharing apparatus 120 which includes a reception unit 122, a decryption unit 124, a bus key generation unit 126, and a transmission unit 128. However, for convenience of description, a storage device 110 and a second device 130 are further illustrated.

The reception unit 122 receives an encrypted device key from the storage device 110 in which the device key encrypted using a predetermined encryption key is stored.

Here, a device key is a unique value allocated and stored in a storage device. For example, the device key stored in the storage device 110 may be a unique device key value of the bus key sharing apparatus 120.

That is, when there are a device "A" and a device "B", a device manufacturer stores respectively different device key values in the device "A" and the device "B" so that the device "A" and the device "B" have respectively different device key values.

Since an encrypted device key is stored in the storage device 110, even though a third party that does not know a decryption key, accesses the storage device 110, the third party can obtain only the encrypted device key whereby risk caused by a leakage of a device key can be reduced.

The storage device 110 may be formed not only with an electrically erasable and programmable read only memory (EEPROM) but also other storage devices which can store a key.

The decryption unit 124 decrypts the encrypted device key received from the reception unit 122 using a decryption key corresponding to the encryption key.

Here, the decryption key and the encryption key are set to have a randomly corresponding value by a device manufacturer when the device is manufactured.

That is, the decryption unit 124 already knows the decryption key corresponding to the encryption key which has been used to encrypt the device key, and decrypts the encrypted device key by using the decryption key which is already known to the decryption unit 124.

The bus key generation unit 126 creates a random number and generates a bus key by using the created random number and the device key decrypted in the decryption unit 124 so that data to be transmitted through a bus can be encrypted using the bus key.

Here, the bus key generation unit 126 generates the bus key by using a key derivation function by receiving the created random number and the decrypted device key as an input.

Also, the bus key generation unit 126 newly creates a random number when a predetermined time passes or when the bus key sharing apparatus 120 is initialized.

For example, when the bus key sharing apparatus 120 is newly booted, the bus key generation unit 126 may newly generate a bus key by newly creating a random number.

A bus key is changed when a predetermined time passes or when the bus key sharing apparatus 120 is initialized, e.g., when the bus key sharing apparatus 120 is booted. Therefore, even if a bus key is leaked to a third party, after the predetermined time passes or after the bus key sharing apparatus 120 is initialized, the leaked bus key cannot be used in decrypting encrypted data to be transmitted through a bus. Thus, the data that is to be transmitted through the bus can be protected more safely.

The bus key sharing apparatus 120 is connected with the storage device 110 and the second device 130 via a bus. Here, the bus may be constituted by not only one of a peripheral component interconnect (PCI) bus and an integrated drive electronics (IDE) bus but also all kinds of user accessible buses.

The transmission unit 128 transmits the bus key generated from the bus key generation unit 126 to the second device 130 connected via the bus.

However, according to other exemplary embodiments, the transmission unit 128 may not directly transmit a bus key to the second device 130 but may transmit a bus key to a central processing unit (CPU) (not shown) so that the CPU receives the bus key and transmits the bus key to the second device 130.

In this way, when the bus key sharing apparatus 120 and the second device 130 share a bus key, encrypted data is received/transmitted between the bus key sharing apparatus 120 and the second device 130, by using the shared bus key. For example, the bus key sharing apparatus 120 may be installed into a network card or a video card.

Figure 2:
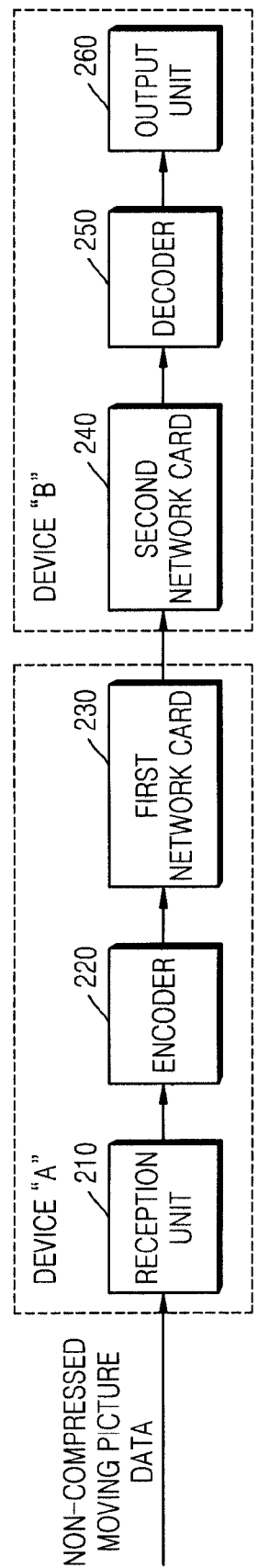
FIG. 2 is a block diagram illustrating a method of transmitting data by using a bus key sharing apparatus, according to an exemplary embodiment of the present invention.

FIG. 2 is a block diagram illustrating a method of transmitting data by using a bus key sharing apparatus, according to an exemplary embodiment of the present invention.

In the current exemplary embodiment illustrated in FIG. 2, a device "A", which includes a reception unit 210, an encoder 220, and a first network card 230, receives non-compressed moving picture data and transmits the non-compressed moving picture data to a device "B", which includes a second network card 240, a decoder 250, and an output unit 260, so that the device "B" outputs the received moving picture data onto a screen.

Here, the first network card 230 and the second network card 240 include a bus key sharing apparatus according to an exemplary embodiment of the present invention, and the encoder 220 and the decoder 250 are devices corresponding to the second device 130 illustrated in FIG. 1. Connections between the encoder 220 and the first network card 230, and between the second network card 240 and the decoder 250, are made via a bus.

Referring to FIG. 2, the first network card 230 shares a bus key with the encoder 220, according to a method of sharing a bus key of the present invention. Also, the second network card 240 and the decoder 250 share a bus key, according to the method of sharing the bus key of the present invention. Here, the bus key shared between the first network card 230 and the encoder 220, and the bus key shared between the second network card 240 and the decoder 250 are bus keys having identical values.

In this way, after a bus key is shared according to the method of sharing the bus key of the present invention, data transmission starts.

At first, the reception unit 210 receives non-compressed moving picture data and transmits the non-compressed moving picture data to the encoder 220.

The encoder 220 encodes the received non-compressed moving picture data, encrypts the encoded moving picture data using a bus key shared with the first network card 230, and then transmits the encrypted moving picture data to the first network card 230.

The first network card 230 then transmits the encrypted moving picture data to the second network card 240.

Here, the first network card 230 may be connected with the second network card 240 via a local area network (LAN) cable, and the like.

The second network card 240 transmits the encrypted moving picture data received from the first network card 230, to the decoder 250.

The decoder 250 decrypts the encrypted moving picture data received from the second network card 240, by using a bus key, and then generates non-compressed moving picture data by decoding the decrypted moving picture data.

The output unit 260 receives the non-compressed moving picture data from the decoder 250 and outputs the non-compressed moving picture data onto a screen.

When data is transmitted in this way, a bus key is changed when a predetermined time passes or when one of devices "A" and "B" is re-booted. Therefore, even if a bus key is leaked to a third party, when a predetermined time has passed or when devices have been re-booted, data is then encrypted using a newly created bus key and transmitted. Thus, the data to be transmitted through a bus can be more safely protected.

FIG. 3 is a flowchart illustrating a method of sharing a bus key between a first device and a second device connected via a bus, according to an exemplary embodiment of the present invention.

In operation 310, an encrypted device key is received from a storage device which stores the predetermined device key encrypted using a predetermined encryption key.

In operation 320, the received encrypted device key is decrypted by using a decryption key which corresponds to the encryption key.

In operation 330, a random number is created and a bus key for encrypting data to be transmitted through a bus, is generated by using the created random number and the decrypted device key.

In operation 340, the generated bus key is transmitted to the second device connected via the bus.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and other storage media.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of sharing a bus key between a first device and a second device connected via a bus, the method comprising:
   receiving at the first device a device key, encrypted using an encryption key, from a storage device;
   decrypting the encrypted device key using a decryption key corresponding to the encryption key;
   creating a random number, and generating a bus key using the created random number and the decrypted device key, the bus key being used to encrypt data to be transmitted through a bus; and
   transmitting the generated bus key to the second device connected via the bus,
   wherein the random number is newly created when at least one of the first device and the second device is re-booted.

2. The method of claim 1, wherein the random number is newly created when a predetermined time passes.

3. The method of claim 1, wherein the device key is a value allocated to the first device and stored in the storage device.

4. The method of claim 1, wherein the second device is one of an encoder performing encoding of data to be transmitted through the bus and a decoder performing decoding of encoded data to be transmitted through the bus.

5. The method of claim 1, wherein the generating of the bus key comprises generating the bus key using a key derivation function, by receiving the created random number and the decrypted device key as an input.

6. The method of claim 1, wherein the bus comprises at least one of a peripheral component interconnect (PCI) bus and an integrated drive electronics (IDE) bus.

7. The method of claim 1, wherein the storage device comprises an electrically erasable and programmable read only memory (EEPROM).

8. The method of claim 1, wherein the encryption key and the decryption key are set by a device manufacturer to have a randomly corresponding value.

9. A bus key sharing apparatus comprising:
   a reception unit, which is connected to a storage device, and which receives a device key, encrypted using an encryption key, from the storage device;
   a decryption unit which decrypts the encrypted device key using a decryption key corresponding to the encryption key;
   a bus key generation unit which creates a random number, and generates a bus key using the created random number and the decrypted device key, the bus key being used to encrypt data to be transmitted through a bus; and
   a transmission unit which transmits the bus key generated from the bus key generation unit to a predetermined device connected via the bus,
   wherein the random number is newly created when at least one of the bus key sharing apparatus and the predetermined device is re-booted.

10. The bus key sharing apparatus of claim 9, wherein the random number is newly created when a predetermined time passes.

11. The bus key sharing apparatus of claim 9, wherein the device key is a value allocated to the bus key sharing apparatus and stored in the storage device.

12. The bus key sharing apparatus of claim 9, wherein the predetermined device is one of an encoder performing encoding of data to be transmitted through the bus and a decoder performing decoding of encoded data to be transmitted through the bus.

13. The bus key sharing apparatus of claim 9, wherein the bus key generation unit generates the bus key by using a key derivation function, by receiving the created random number and the decrypted device key as an input.

14. The bus key sharing apparatus of claim 9, wherein the bus comprises at least one of a peripheral component interconnect (PCI) bus and an integrated drive electronics (IDE) bus.

15. The bus key sharing apparatus of claim 9, wherein the storage device comprises an electrically erasable and programmable read only memory (EEPROM).

16. The bus key sharing apparatus of claim 9, wherein the encryption key and the decryption key are set by a device manufacturer to have a randomly corresponding value.

17. A non-transitory computer readable recording medium having recorded thereon a program for executing a method of sharing a bus key between a first device and a second device connected via a bus, the method comprising:
  receiving at the first device a device key, encrypted using an encryption key, from a storage device;
  decrypting the encrypted device key using a decryption key corresponding to the encryption key;
  creating a random number, and generating a bus key using the created random number and the decrypted device key, the bus key being used to encrypt data to be transmitted through a bus; and
  transmitting the generated bus key to the second device connected via the bus,
  wherein the random number is newly created when at least one of the first device and the second device is re-booted.

18. The computer readable recording medium of claim 17, wherein the encryption key and the decryption key are set by a device manufacturer to have a randomly corresponding value.

* * * * *